United States Patent Office 3,579,541
Patented May 18, 1971

3,579,541
CYCLIC DIPEROXIDES
Yun G. Chang, Austin, Tex., assignor to Reichhold
Chemicals, Inc., White Plains, N.Y.
No Drawing. Filed June 4, 1968, Ser. No. 734,258
Int. Cl. C07d 19/00
U.S. Cl. 260—338                                 9 Claims

ABSTRACT OF THE DISCLOSURE

Cyclic peroxides are prepared by reacting hydroxy acetone with a difunctional hydroperoxide. The reaction takes place in a solvent at a temperature ranging from about 0° C. to 100° C. in presence of an acidic catalyst. The resulting cyclic peroxides are found to be highly efficient polymerization initiators and cross-linking agents.

This invention relates to a novel class of organic peroxides and methods of making them. Particularly, this invention relates to peroxides obtained by the reactions of hydroxy-acetone with difunctional hydroperoxides. More particularly, it is directed to cyclic perketals. The molecule of these cyclic perketals contains a 9-membered ring which contains two peroxide groups. A large number of these novel peroxides can be represented by the general formula

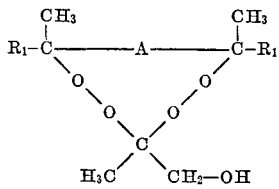

wherein $R_1$ is either alkyl, cycloalkyl, alkcycloalkyl, aralkyl, aryl, alkaryl, or the corresponding halo substituted group, and A is a member of the group consisting of —$CH_2$—$CH_2$—, —CH=CH—, and —C≡C—.

Another group of these cyclic perketals may be shown by the following formula

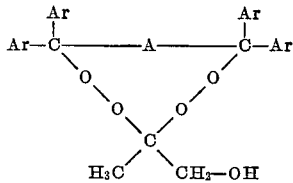

wherein Ar is an aryl, or an alkaryl group, and A is the same as in the preceding paragraph.

Still another group of these cyclic perketals may have the formula

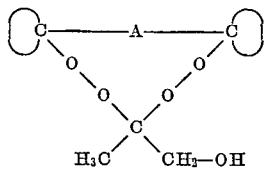

wherein

is a cycloaliphatic group, and A has the same meaning as mentioned above.

Cyclic diperoxides have been described before. Thus, U.S. Pat. No. 3,117,166 discloses a peracetal, namely a benzaldehyde adduct of 2,5-dihydroperoxy-2,5-dimethylhexane. As described below in Example VII, the effectiveness of this catalyst is greatly inferior to the one described in Example I as exhibited in Table A hereinbelow.

It is an object of this invention to provide a novel class of peroxides which are highly efficient polymerization initiators and cross-linking agents.

It is another object of this invention to provide highly efficient methods for the preparation of such polymerization initiators and cross-linking agents.

It is still another object of this invention to produce these peroxides from hydroxy-acetone.

These and other objects and advantages of the present invention will become more apparent from the detailed description thereof set forth hereinbelow.

It has been found that these objectives can be attained by reacting hydroxy-acetone with difunctional hydroperoxides in a solvent in the presence of an acidic catalyst. This reaction takes place at a temperature ranging from about 0° C. and about 40° C., on account of the outstanding results obtained therefrom.

In the reactions of the present invention, the mole ratio of hydroxy-acetone to the difunctional hydroperoxide may vary widely, for example, from about 10:1 to about 1:10. The preferred mole ratio of hydroxy-acetone to difunctional hydroperoxide is 1:1.

It has been found that p-dioxane is a suitable solvent for dissolving the solid difunctional hydroperoxides and for the reaction. Other ethers, such as tetrahydrofuran, diethyl ether may also be used as solvents.

In the present invention, the acidic catalyst for the reaction between hydroxy-acetone and difunctional hydroperoxides may be sulfuric acid, hydrochloric acid, perchloric acid, or phosphoric acid. The amount of the acid catalyst used for the reaction may vary from a trace to about 20%, based on the weight of the reaction mixture described below. Usually, the amount of about 10%, based on the weight of said reaction mixture is preferred.

The difunctional hydroperoxides used in this invention may be represented by one of the general formulas:

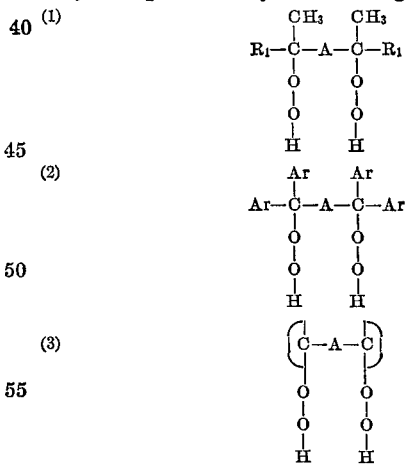

wherein $R^1$ is either alkyl, cycloalkyl, alkcycloalkyl, aralkyl, aryl, alkaryl, or the corresponding halo substituted group; A is a member of the group consisting of —$CH_2$—$CH_2$—, —CH=CH—, and —C≡C—; Ar is an aryl or an alkaryl group; and

is a cycloaliphatic group.

This novel class of organic peroxides has been found to provide excellent initiators in polymerization reactions, such as the polymerizations of styrene, vinyl acetate, alkyl methacrylates, and the like. These peroxides have also been found to be excellent cross-linking agents for polyethylene, polypropylene, and the like.

3

Some of the representative preparatory reactions are illustrated by the following equations:

EQUATION (1)

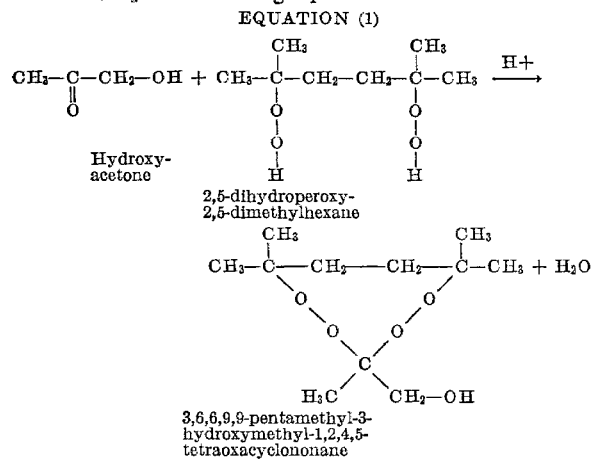

EQUATION (2)

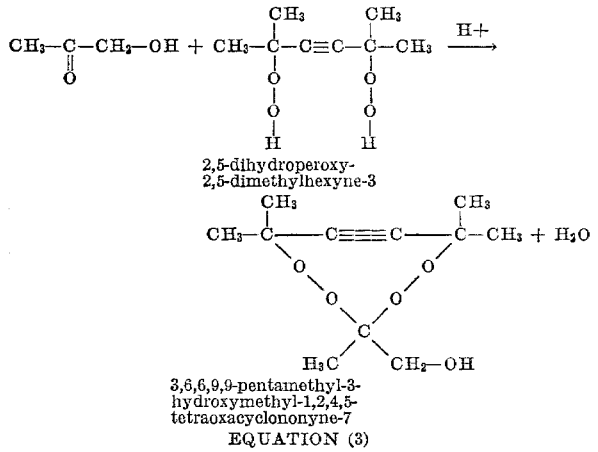

EQUATION (3)

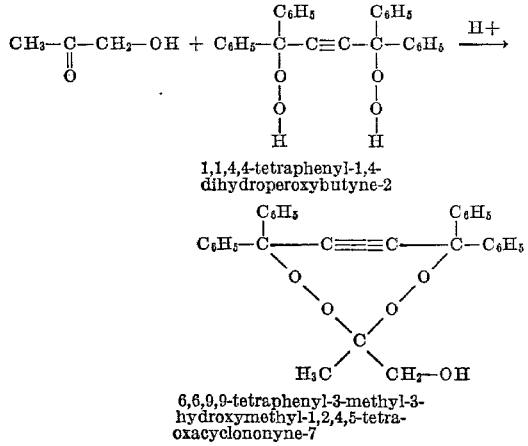

EQUATION (4)

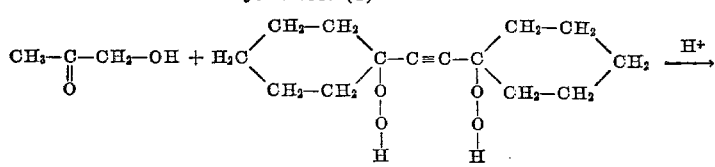

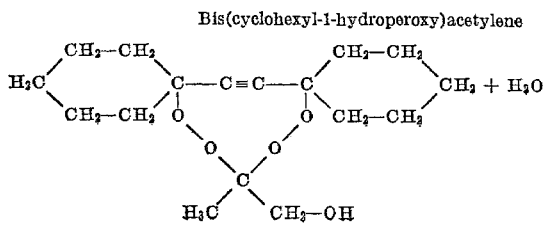

4

In order to understand this invention more clearly non-limiting examples are presented primarily by way of illustration.

EXAMPLE I

Preparation of 3,6,6,9,9-pentamethyl-3-hydroxymethyl-1,2,4,5-tetraoxacyclononane Thirty-five and six tenths grams (0.2 mole) of 2,5-dihydroperoxy-2,5-dimethylhexane was dissolved in 80 ml. of p-dioxane. To the clear solution was added 14.0 g. (0.1 mole) of 70% sulfuric acid. To the resulting mixture was slowly added 14.8 g. (0.2 mole) of hydroxy-acetone, at room temperature, with agitation. The reaction mixture was stirred at room temperature for six hours, and then was allowed to stand for about twelve hours.

The reaction mixture appeared to contain two layers. The upper, organic layer was separated. It was mixed with 100 ml. of water. A heavy oily liquid was formed. This liquid was separated and dissolved in 50 ml. of diethyl ether. The resulting solution was washed three times with 30-ml. portions of saturated sodium bicarbonate solution and three times with 30-ml. portions of water, and finally dried over anhydrous magnesium sulfate. Filtration and removal of ether under reduced pressure with a water aspirator and a rotating evaporator left a clear heavy liquid product weighing 32.0 g., indicating a 68.4% yield based upon the amount of hydroxyacetone used for the reaction. After standing at room temperature for about twenty minutes, the liquid became colorless crystalline solid rapidly and completely. The crude product melted at about 64–66° C. and contained 14.32% active oxygen shown by the hydriodic acid-sodium thiosulfate titration. It contained no hydroperoxide as indicated by the lead tetraacetate test. After being purified by several crystallizations from warm dilute ethyl alcohol, the product melted at about 71–73° C. It contained 13.84% active oxygen determined by the treatment with hydriodic acid and the titration with sodium thiosulfate solution, as compared with the theoretic active oxygen content 13.68%.

*Analysis.*—Calcd. for $C_{11}H_{22}O_5$ (percent): C, 56.39; H, 9.47; O, 34.14 (molecular weight 234). Found (percent): C, 56.40; H, 9.59; O, 34.10 (molecular weight 201).

The infrared spectrum of this compound showed a medium band at about 3570–3400 cm.$^{-1}$, due to a —OH group; a strong band at 1370 cm.$^{-1}$, due $>C(CH_3)_2$ groups; a medium band at 1316 cm.$^{-1}$, due to a —CH$_2$OH group; two medium bands at 1176 cm.$^{-1}$ and 1145 cm.$^{-1}$, and two strong bands at 1112–1110 cm.$^{-1}$ and 1060 cm.$^{-1}$, indicating the perketal structure; and a strong band at 863 cm.$^{-1}$, representing the peroxide groups.

On the basis of the analytical data and the infrared spectrum, the structure of this new peroxide is assigned as follows.

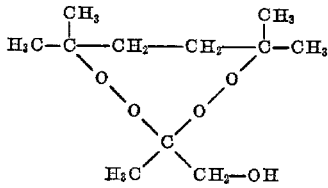

EXAMPLE II

Preparation of 3,6,9-trimethyl-6,9-diethyl-3-hydroxy-methyl-1,2,4,5-tetraoxacyclononane Into a mixture of 20.6 g. (0.1 mole) of 3,6-dihydroperoxy-3,6-dimethyloctane, 50 ml. of p-dioxane and 7.0 g. of 70% (0.05 mole) of sulfuric acid, was slowly added 7.4 g. (0.1 mole) of hydroxy-acetone, at room temperature, with agitation. The reaction mixture was stirred at room temperature for six hours, and then allowed to stand for twelve hours. The organic layer was separated and diluted with 60 ml. of water. A heavy oily liquid was obtained. The liquid was separated and dissolved in 30 ml. of diethyl ether. The ether solution was washed three times with saturated sodium bicarbonate solution and three times with water, and finally dried over anhydrous magnesium sulfate. Filtration and removal of low-boiling materials under reduced pressure gave a clear, heavy liquid product, with about 70% yield based upon the hydroxy-acetone used for the reaction. On standing at room temperature, this liquid became colorless crystalline solid. This peroxide was the cyclic perketal, 3,6,9-trimethyl-6,9-diethyl-3-hydroxy-methyl-1,2,4,5-tetraoxacyclononane, as shown by its active oxygen content.

EXAMPLE III

Preparation of 3,6,6,9,9-pentamethyl-3-hydroxy methyl-1,2,4,5-tetraoxacyclononyne-7

Into a mixture of 17.4 g. (0.1 mole) of 2,5-dihydroperoxy-2,5-dimethylhexyne-3, 40 ml. of p-dioxane and 7.0 g. of 70% (0.05 mole) of sulfuric acid, was slowly added 7.4 g. (0.1 mole) of hydroxy-acetone, at room temperature with agitation. The reaction mixture was stirred at room temperature for six hours and then allowed to stand for about twelve hours. The organic layer was separated and diluted with 50 ml. of water. A heavy oily liquid appeared in the mixture. The liquid was separated and dissolved in 30 ml. of diethyl ether. The ether solution was thoroughly washed with saturated sodium bicarbonate solution and with water, and finally dried over anhydrous magnesium sulfate. Removal of low-boiling materials under reduced pressure left a clear, heavy liquid product, in about 70% yield based upon the hydroxy-acetone used for the reaction. On standing at room temperature, the liquid became colorless crystalline solid. The determination of active oxygen content showed that this new peroxide is the cyclic perketal, 3,6,6,9,9-pentamethyl-3-hydroxymethyl-1,2,4,5-tetraoxacyclononyne-7.

EXAMPLE IV

Preparation of 3,6,9-trimethyl-6,9-diethyl-3-hydroxy methyl-1,2,4,5-tetraoxacyclononyne-7

Into a mixture of 20.2 g. (0.1 mole) of 3,6-dihydroperoxy-3,6-dimethyloctyne-4, 50 ml. of p-dioxane and 7.0 g. (0.05 mole) of 70% sulfuric acid, was slowly added 7.4 g. (0.1 mole) of hydroxy-acetone, at room temperature, with stirring. The reaction mixture was stirred at room temperature for six hours, and then allowed to stand for about twelve hours. The organic layer was separated and treated in the same manner as described in the previous examples. A new peroxide was obtained as colorless crystalline solid in a 70% yield based upon the hydroxy-acetone used for the reaction. According to the active oxygen content, this peroxide is 3,6,9-trimethyl-6,9-diethyl-3-hydroxymethyl-1,2,4,5-tetraoxacyclononyne-7.

EXAMPLE V

Preparation of 6,6,9,9-tetraphenyl-3-methyl-3-hydroxy-methyl-1,2,4,5-tetracyclononyne-7

To a mixture of 4.22 g. (0.01 mole) of 1,1,4,4-tetraphenyl-1,4-dihydroperoxybutyne-2, 15 ml. of p-dioxane and 0.70 g. (0.005 mole) of 70% sulfuric acid, was added 0.74 g. (0.01 mole) of hydroxy-acetone, at room temperature, with stirring. The reaction mixture was stirred at room temperature for about six hours, and then allowed to stand for about twelve hours. The organic layer was separated and treated the same way as described in Example I. A new peroxide was obtained as colorless crystalline solid in a 70% yield based on the hydroxy-acetone used for the reaction. As shown by the active oxygen, this new peroxide is the cyclic perketal, 6,6,9,9-tetra-phenyl-3-methyl-3-hydroxy-methyl-1,2,4,5-tetraoxacyclononyne-7.

EXAMPLE VI

Cyclic perketal derived from hydroxy-acetone and bis(cyclohexyl-1-hydroperoxy)acetylene To a mixture of 5.08 g. (0.02 mole) of bis(cyclohexyl-1-hydroperoxy) acetylene, 15 ml. of p-dioxane and 1.40 g. (0.01 mole) of 70% sulfuric acid, was added 1.48 g. (0.02 mole) of hydroxy-acetone, at room temperature, with stirring. The reaction mixture was stirred at room temperature for about six hours, and then allowed to stand for about twelve hours. The organic layer was separated and treated the same way as described in Example I. A new peroxide was obtained as colorless crystalline solid in 70% yield based upon the hydroxy-acetone used for the reaction. According to the active oxygen content, the new peroxide is the cyclic perketal having the structural formula shown below.

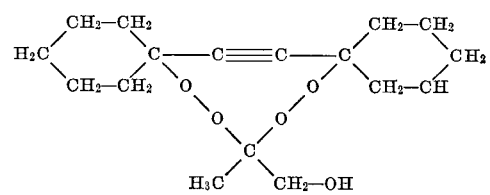

EXAMPLE VII

Preparation of an adduct of benzaldehyde and 2,5-dihydroperoxy-2,5-dimethylhexane 17.8 grams (0.1 mole) of 2,5-dihydroperoxy-2,5-dimethyl hexane were dissolved in p-dioxane. Then, 7.0 grams of 70% sulfuric acid were added. To this mixture 10.6 grams (0.1 mole) of benzaldehyde were added as the next step. The mixture was stirred briefly and allowed to stand for about 30 hours at about 20–25° C. Two layers separated in this time. Thirty ml. of water were added and the inhomogeneous mixture was extracted three times with 20-ml. portions of ether. The ether extract was washed with carbonate-bicarbonate solution, then with water and, finally, dried over magnesium sulfate. The ether was evaporated under aspirator vacuum to obtain 27 grams of a viscous liquid.

After standing five days, approximately three-quarters of the material crystallized. This solid was recrystallized four times from 60% ethanol. Melting point was 45° C. with an active oxygen content of 13.4%. (Theory 12.0.)

TABLE A

A standard SPI Gel and Cure test was made, using 1% of the cyclic diperoxide in Polylite 31–006 (a polyester resin manufactured by Reichhold Chemicals Incorporated, White Plains, N.Y.) at a bath temperature of 250° F.

Results were as follows:

| | Gel time, sec. | Cure time, sec. | Max. exotherm, ° F. | Barcol hardness |
|---|---|---|---|---|
| Resin containing 1% peroxide of Example I | 117 | 151 | 436 | 48–50 |
| Resin containing 1% peroxide of Example VII | 370 | 730 | 406 | 40–42 |

What is claimed is:
1. An organic peroxide having the general formula

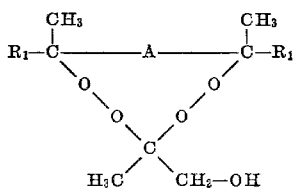

wherein $R_1$ is alkyl; and A is a member selected from the group consisting of —$CH_2$—$CH_2$—, and —C≡C—.

2. A peroxide having the general formula

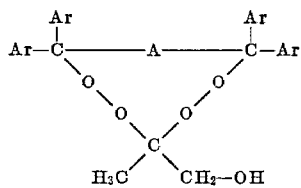

wherein Ar is phenyl and A is —C≡C—.

3. A peroxide having the general formula

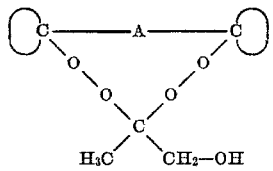

wherein

is a cyclohexane ring and A is —C≡C—.

4. 3,6,6,9,9 - pentamethyl - 3 - hydroxymethyl - 1,2,4,5-tetraoxacyclononane.

5. 3,6,9 - trimethyl - 6,9 - diethyl - 3 - hydroxymethyl-1,2,4,5-tetraoxacyclononane.

6. 3,6,6,9,9 - pentamethyl - 3 - hydroxymethyl - 1,2,4,5-tetraoxacyclononyne-7.

7. 3,6,9 - trimethyl - 6,9 - diethyl - 3 - hydroxymethyl-1,2,4,5-tetraoxanonyne-7.

8. 6,6,9,9-tetraphenyl - 3 - methyl - 3 - hydroxymethyl-1,2,4,5-tetraoxanonyne-7.

9. A peroxide having the structural formula

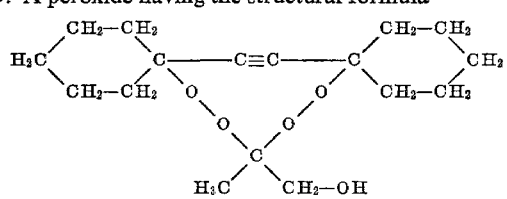

References Cited
UNITED STATES PATENTS
3,117,166   1/1964   Harrison et al. _____ 260—610

NORMA S. MILESTONE, Primary Examiner

U.S. Cl. X.R.
260—610